(12) United States Patent
Smith et al.

(10) Patent No.: US 10,392,971 B2
(45) Date of Patent: Aug. 27, 2019

(54) NACELLE

(71) Applicant: ROLLS-ROYCE, PLC, London (GB)

(72) Inventors: Angus R Smith, Derby (GB);
Christopher T Sheaf, Derby (GB);
David G MacManus, Buckingham (GB); Robert E Christie, Cranfield (GB)

(73) Assignee: ROLLS-ROYCE plc, London (GB)

(*) Notice: Subject to any disclaimer, the term of this patent is extended or adjusted under 35 U.S.C. 154(b) by 322 days.

(21) Appl. No.: 15/361,234

(22) Filed: Nov. 25, 2016

(65) Prior Publication Data
US 2017/0167295 A1    Jun. 15, 2017

(30) Foreign Application Priority Data

Dec. 11, 2015    (GB) .................... 1521871.2

(51) Int. Cl.
| | |
|---|---|
| *F01D 25/24* | (2006.01) |
| *F01D 9/02* | (2006.01) |
| *B64D 33/02* | (2006.01) |
| *F04D 29/52* | (2006.01) |
| *F02C 7/04* | (2006.01) |

(Continued)

(52) U.S. Cl.
CPC ............ *F01D 25/24* (2013.01); *B64D 33/02* (2013.01); *F01D 9/02* (2013.01); *F01D 25/04* (2013.01); *F02C 7/04* (2013.01); *F04D 29/526* (2013.01); *F04D 29/664* (2013.01); *B64D 2033/0226* (2013.01); *F05D 2220/323* (2013.01); *F05D 2270/17* (2013.01); *Y02T 50/671* (2013.01)

(58) Field of Classification Search
CPC . F01D 25/24; F01D 25/04; F01D 9/04; F01D 9/047; F01D 9/06; F04D 29/526; F04D 29/663; F02C 7/04; F02C 7/045; B64D 33/02
See application file for complete search history.

(56) References Cited

U.S. PATENT DOCUMENTS

| | | |
|---|---|---|
| 5,860,275 A | 1/1999 | Newton et al. |
| 2008/0092548 A1 | 4/2008 | Morford et al. |

(Continued)

FOREIGN PATENT DOCUMENTS

| | | |
|---|---|---|
| EP | 2060489 A2 | 5/2009 |
| EP | 2607657 A2 | 6/2013 |

(Continued)

OTHER PUBLICATIONS

Apr. 18, 2017 Search Report issued in European Patent Application No. 16200707.

(Continued)

*Primary Examiner* — Jacob M Amick
(74) *Attorney, Agent, or Firm* — Oliff PLC (57) ABSTRACT

A nacelle for a turbofan gas turbine engine, having in flow series an intake lip, a diffuser and a fan casing. The diffuser has, in flow series, a main section and a recessed section adjacent to the fan casing. A transition region, such as a step, slope or curve, is provided between the main section and the recessed section. In some arrangements the transition region may be configured to promote flow separation and the formation of a separation bubble in the recessed section.

16 Claims, 8 Drawing Sheets

(51) Int. Cl.
*F01D 25/04* (2006.01)
*F04D 29/66* (2006.01)

(56) References Cited

U.S. PATENT DOCUMENTS

| | | | | |
|---|---|---|---|---|
| 2010/0276007 A1* | 11/2010 | Hendricks | ............... | F02C 7/04 |
| | | | | 137/15.1 |
| 2012/0031501 A1* | 2/2012 | Tuan | ............... | B64D 33/02 |
| | | | | 137/15.1 |
| 2013/0283821 A1* | 10/2013 | Gilson | ............... | F02K 3/06 |
| | | | | 60/805 |
| 2015/0330230 A1 | 11/2015 | Zelesky et al. | | |

FOREIGN PATENT DOCUMENTS

| | | |
|---|---|---|
| EP | 3001014 A1 | 3/2016 |
| GB | 1291943 A | 10/1972 |
| GB | 2 385 382 A | 8/2003 |

OTHER PUBLICATIONS

May 23, 2016 Search Report issued in Great Britain Patent Application No. 1521871.2.

* cited by examiner

NACELLE

The disclosure relates to a nacelle for a turbofan gas turbine engine comprising a diffuser having a main section and a recessed section.

A turbofan gas turbine engine comprises a fan housed within an aerodynamic nacelle which typically comprises an intake lip and diffuser. The geometry of the intake lip and diffuser is chosen to maximise aerodynamic performance of the gas turbine engine in use. Specifically, the geometry of the intake lip is designed to prevent flow separation at the corner of flight envelope conditions, and the geometry of the diffuser is designed to guide the air flow towards the fan. The nacelle is designed to be as small as possible in order to minimise drag at cruise conditions.

There is a trend in large civil aero engine gas turbine design to use larger diameter fans having a lower pressure ratio in order to enable overall cycle efficiency gains. However, in order to accommodate a larger diameter fan the dimensions of the nacelle must be increased proportionally to maintain equivalent intake aerodynamic performance. This results in a nacelle having an increased cross-section which may have a detrimental impact on both nacelle weight and drag.

Further, since the turbofan gas turbine engine is designed to fit under an airframe wing, this places constraints on the size of the nacelle and other factors such as the ground clearance, for example.

It is therefore desirable to provide an improved nacelle for a turbofan gas turbine engine which may allow a larger fan to be used when compared to existing nacelle designs.

According to an aspect there is provided a nacelle for a turbofan gas turbine engine, comprising in flow series an intake lip, a diffuser and a fan casing, the diffuser having, in flow series, a main section and a recessed section adjacent to the fan casing, wherein a transition region is provided between the main section and the recessed section and wherein the nacelle is provided with an arrangement to supply pressure in a region of either or both of the transition region and recessed section. The recessed section may allow a larger diameter fan to be housed within the nacelle when compared with conventional nacelle designs of a comparable outer diameter. The recessed section may allow a larger diameter fan to be accommodated whilst maintaining more conventional intake lip and main diffuser section geometries.

The pressure supplied in the region of either or both of the transition region and recessed section may be positive. Additionally or alternatively, the pressure supplied in the region of either or both of the transition region and recessed section may be negative. The supply of pressure in either or both of the aforementioned regions may have the effect of stabilising, re-energising or eliminating the separation bubble, or controlling its size. This may improve engine performance.

The transition region may be configured to promote flow separation and the formation of a separation bubble in the recessed section. The intake lip may be designed to inhibit flow separation under normal operational conditions and the main diffuser section may be designed to guide the airflow towards the fan whilst preventing or inhibiting flow separation. The transition region may have either or both of a gradient and a profile. This may, in use, cause flow separation to occur. This may promote the formation of a separation bubble in the recessed section. The inner diameter of the diffuser section at the upstream end of the transition region may be smaller than the inner diameter of the diffuser section at the downstream end of the transition region.

The transition region may comprise a step, a slope or a curve. The transition region may comprise any generalised curve or profile. In some arrangements, the axial length of the transition region may be less than the radial depth of the transition region. This may form a steep gradient or profile ensuring that flow separation occurs at the transition region, resulting in the formation of a separation bubble within the recessed section in front of the fan.

The surface of the recessed section may be offset radially outward with respect to the surface of the main section. Thus, the inner diameter of the surface of the main diffuser section may be smaller than inner diameter of the surface of the recessed section.

The radial depth of the recessed section may be between 0.1%-5% of the inner diameter of the fan casing. The radial depth of the recessed section may be between 1 mm and 100 mm, or between 2 mm and 50 mm, or between 4 mm and 30 mm, for example. The axial length of the recessed section may be between 0 mm and 500 mm, between 0.1 mm and 500 mm, between 1 mm and 500 mm, between 1 mm and 350 mm, or between 10 mm and 200 mm, for example. The axial length of the transition region may be between 0 mm and 100 mm, or between 2 mm and 50 mm, or between 4 mm and 20 mm, for example.

In some arrangements, the axial length of the transition region may be less than the recessed depth of the recessed section.

The recessed section may be annular. Therefore, there may be a single recessed annular section that extends around the entire inner circumference of the nacelle. The recessed section may be of a uniform radial depth or it may vary axially, circumferentially or both axially and circumferentially. The recessed section may comprise a circumferentially extending arcuate section. There may be a single recessed section in the form of a single circumferentially extending arcuate section. The circumferentially extending arcuate section may be located at the bottom of the nacelle when in use (e.g. towards the bottom when mounted under an aircraft wing). The circumferentially extending arcuate section may be located close to the intake sideline.

There may be a plurality of recessed sections, each comprising a circumferentially extending arcuate section. The circumferentially extending arcuate sections may be evenly distributed around the circumference of the nacelle. There may be a circumferentially extending arcuate section located at the bottom of the nacelle. There may be a pair of circumferentially extending arcuate sections located on diametrically opposite sides of the nacelle. The depth of the arcuate sections may be uniform, or may vary axially or circumferentially. For example, at least one circumferentially extending arcuate section may have a depth that reduces in depth circumferentially from a central position towards the edges such that it is blended into the inner wall of the nacelle.

The nacelle may comprise an acoustic liner provided on the surface of the transition region. Additionally or alternatively, the nacelle may comprise an acoustic liner provided on the surface of the recessed section. The nacelle may further comprise one or more acoustic liner sections which project from the surface of the transition region. There may be a plurality of acoustic liner sections of differing lengths.

The nacelle may further comprise one or more openings in the region of the transition region. Additionally or alternatively, the nacelle may further comprise one or more openings in the region of the recessed section. Such openings may be arranged such that pressure can be applied in either or both of the region of the transition region and the recessed section. For example, there may be openings in the walls of either or both of the recessed section and the transition region. This may allow a negative pressure to be applied in order to stabilise or eliminate a separation bubble. Further, this may allow a positive pressure to be applied to aerodynamically re-energise the separation bubble.

According to another aspect, there is provided a turbofan gas turbine engine comprising a nacelle in accordance with any statement herein.

Various arrangements will now be described, by way of example, with reference to the accompanying drawings, in which.

Figure 1:
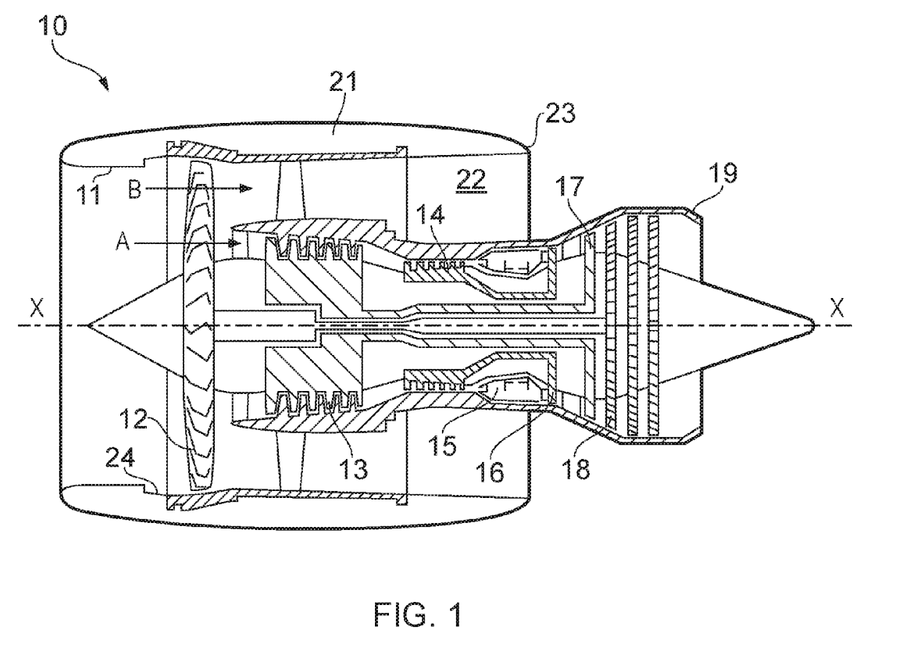
FIG. 1 schematically a shows a cross-section of a turbofan gas turbine engine.

FIG. 1 shows a ducted fan gas turbine engine 10 having a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Figure 2:
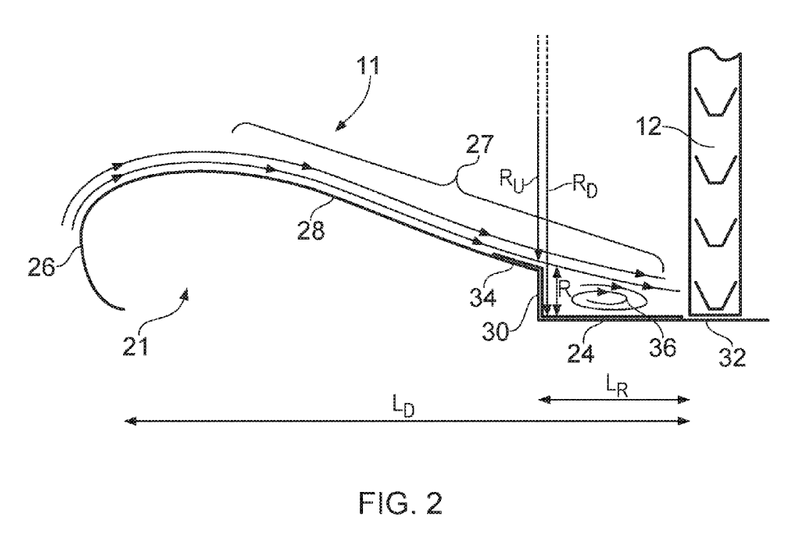
FIG. 2 schematically shows an enlarged view of the intake of the gas turbine engine of FIG. 1 according to a first arrangement.

FIG. 2 shows an enlarged view of the intake 11 of the nacelle 21 and the fan 12. As shown, the intake 11 comprises, in axial flow series, an intake lip 26, a diffuser 27 and a fan casing 32 which houses the fan 12. The diffuser 27 comprises, in axial flow series, a main section 28, a transition region 30 and a recessed section 24. In this arrangement the inner surface of the nacelle 21 is a revolved surface that is rotationally symmetric. The recessed section 24 is therefore annular and has a substantially constant radial depth. However, it should be appreciated that in other embodiments the recessed section 24 may not be annular and therefore the inner surface of the nacelle 21 may therefore not be rotationally symmetric. In some arrangements the radial depth of the recessed section 24 may vary in the circumferential direction.

In this arrangement, the transition region 30 is in the form of a step. The surface of the step forming the transition region 30 is perpendicular to the central axis X-X of the nacelle 21. The transition region step 30 forms a transition between the main diffuser section 28 and the recessed section 24 and has a radial depth R. Thus, the inner radius $R_U$ of the diffuser 27 at the upstream end of the transition region 30 is smaller than the inner radius of the diffuser 27 at the downstream $R_D$ end of the transition region 30. The difference between these two radii is the depth of the step R. The depth of the step R is the depth by which the surface of the recessed section 24 is outwardly radially offset from the surface of the main diffuser section 28. The nacelle 21 also comprises an acoustic liner 34, which in this arrangement is provided on the surface of the recessed section 24, transition region 30, and a portion of the length of the main diffuser section 28.

For a fan diameter of approximately 2.5 m, the length of the diffuser 27, $L_D$, may be approximately 1 m, and the depth R of the recessed section 24 may be approximately 0.01 m. Since the transition region 30 is a step, the axial length of the transition region 30 is zero. The length $L_R$ of the recessed section 24 may be approximately 0.15 meters. It should be appreciated that the dimensions indicated above are merely examples and any suitable dimensions could be chosen depending on the size of either or both of the engine and the geometry of the nacelle 21, for example.

During operation of the turbofan gas turbine engine, the airflow follows the curvature of the intake lip 26 and the main diffuser section 28 as attached flow. At the transition region 30, the flow separates from the inner surface due to the profile of the step (which in this case is 90° with respect to the central axis). This results in the formation of a stable separation bubble 36 within the recessed section 24. The suction effect of the fan 12 suppresses the separation, which reduces the size of the separation bubble 36. The geometry and location of the transition region 30 and recessed section 24 results in negligible deterioration in the level of aerodynamic flow distortion reaching the fan 12.

The use of a transition region 30 and a recessed section 24 allows the use of a larger diameter fan, whilst maintaining relatively conventional geometry for the intake lip 26 and the main diffuser section 28. This means that whilst flow separation does occur, it occurs at a known predictable location which can be accommodated for. Without the use of a transition region 30 and a recessed section 24, either the intake lip 26 would have to be made thinner or the main diffuser section 28 would have to be made steeper in order to accommodate the larger fan 12, or both. However, the redesign of the lip 26 and main diffuser 28 may result in more unpredictable flow separation, which may adversely affect the performance of the gas turbine engine. Further, the transition region 30 also provides additional surface area for the acoustic liner 34. This allows additional acoustic liner 34 material to be provided which enhances the general acoustic damping of the fan 12. In summary, in this arrangement the transition region 30 and recessed section 24 allows the retention of a conventional or close to conventional intake lip 26 and main diffuser 28 geometry whilst accommodating a larger diameter fan 12.

In addition or instead of providing an acoustic liner 34 on the surface of the main diffuser section 28, transition region 30 and recessed section 24, further acoustic liner sections may be provided which project from one or more of the surface of the main diffuser section 28, transition region 30 and recessed section 24. The liners may be substantially perpendicular from the surface, or may be inclined slightly. Further, there may be a plurality of projecting acoustic liner sections having different lengths. The lengths may be chosen to tune out specific fan tip frequencies. This may further enhance the suppression or damping of specific frequency acoustic waves.

The nacelle 21 described in relation to FIG. 2 can be additionally provided with an arrangement to supply pressure. The arrangement can be configured to supply pressure in a region of the transition region 30. Additionally or alternatively, the arrangement can be configured to supply pressure in a region of recessed section 24. The pressure supplied to either or both of the transition region 30 and the recessed section 24 can be positive. Additionally or alternatively, the pressure supplied to either or both of the transition region 30 and the recessed section 24 can be negative. In particular, the wall of the transition region 30 could be provided with one or more openings. Additionally or alternatively, the wall of the recessed section 24 could be provided with one or more openings. In this way, one or more such openings may be provided in the region of either or both of the transition region 30 and the recessed section 24. Such openings can allow air to be injected into or sucked away from either or both of the recessed section 24 and the transition region 30.

Figure 3:
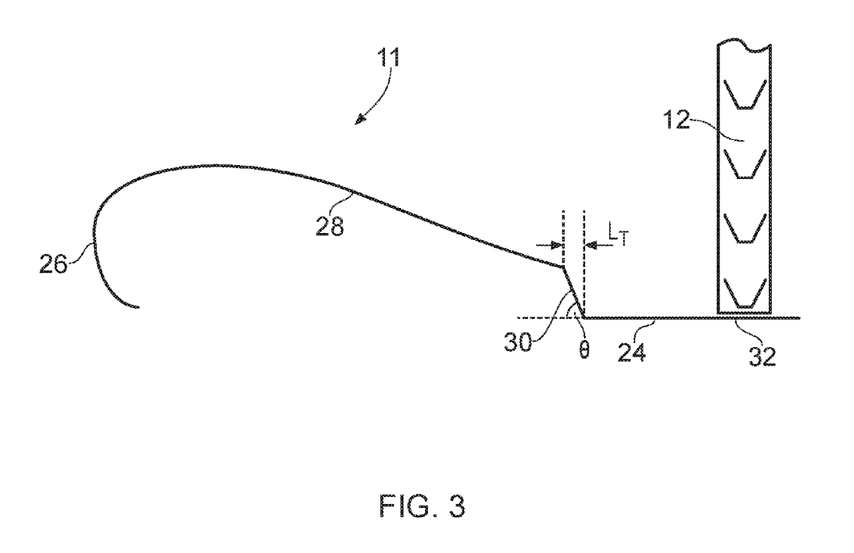
FIG. 3 schematically shows an enlarged view of the intake of the gas turbine engine of FIG. 1 according to a second arrangement.
Figure 4:
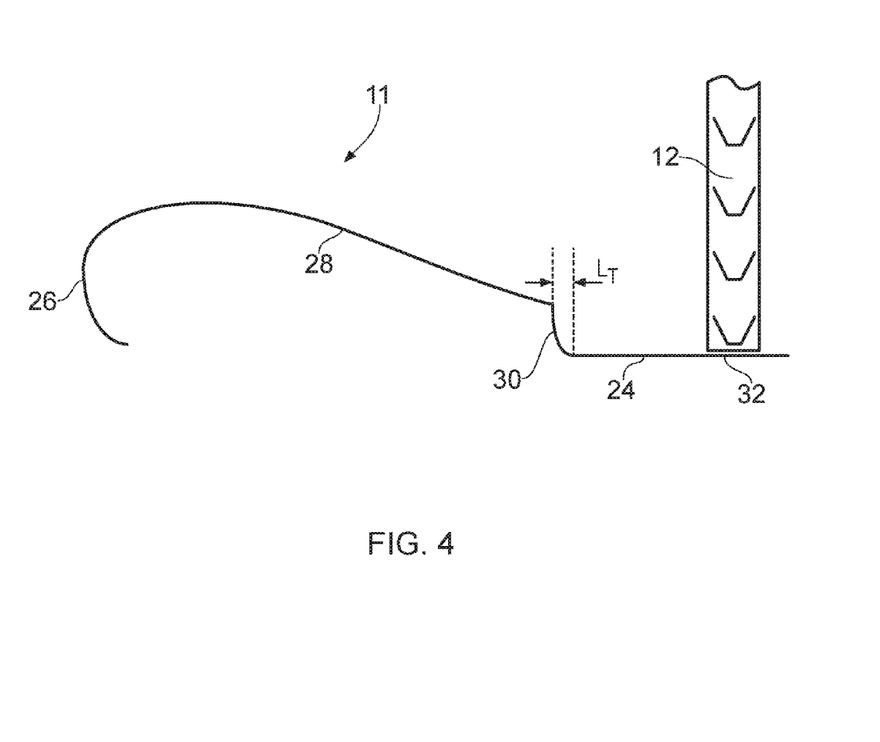
FIG. 4 schematically shows an enlarged view of the intake of the gas turbine engine of FIG. 1 according to a third arrangement.

In the arrangement described above the transition region 30 is in the form of a step perpendicular to the central axis. However, it should be appreciated that the transition region may be of any suitable shape. For example, as shown in FIG. 3 the transition region may comprise a slope having a constant gradient. In the arrangement shown in FIG. 3 the slope has a gradient 0 of 60° with respect to the central axis. In other arrangements the gradient could be 45°, 75° or 85°, for example. The gradient of the slope may be selected in order to promote flow separation, thereby forming a separation bubble 36 in the recessed section 24. As shown in FIG. 4, the transition region 30 may comprise a curved surface of any suitable curvature. For example, the curved surface could be inwardly or outwardly curved, the curvature being chosen to promote flow separation and the formation of a separation bubble 36. In some arrangements, the length of the transition region, $L_T$, may be less than or equal to the radial depth R of the recessed section 24 so that flow separation occurs at the transition region 30. In other arrangements the length of the transition region, $L_T$, may be greater than the radial depth R of the recessed section 24.

The nacelle 21 described in relation to FIG. 3 or 4 can be additionally provided with an arrangement to supply pressure. The arrangement can be configured to supply pressure in a region of the transition region 30. Additionally or alternatively, the arrangement can be configured to supply pressure in a region of recessed section 24. The pressure supplied to either or both of the transition region 30 and the recessed section 24 can be positive. Additionally or alternatively, the pressure supplied to either or both of the transition region 30 and the recessed section 24 can be negative. In particular, the wall of the transition region 30 could be provided with one or more openings. Additionally or alternatively, the wall of the recessed section 24 could be provided with one or more openings. In this way, one or more such openings may be provided in the region of either or both of the transition region 30 and the recessed section 24. Such openings can allow air to be injected into or sucked away from either or both of the recessed section 24 and the transition region 30.

Figure 5:
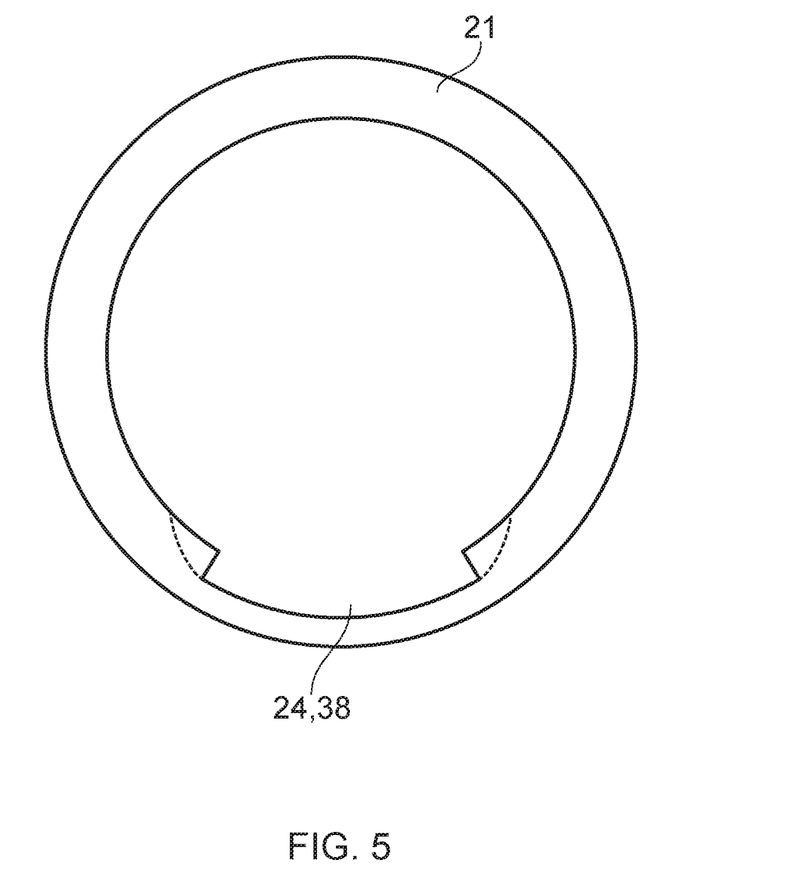
FIG. 5 schematically shows a cross-section of the nacelle of the gas turbine engine of FIG. 1 according to a fourth arrangement.

In the arrangements described above the nacelle 21 comprises a single annular recessed section 24. However, in other arrangements there may be one or more recessed sections, each in the form of a circumferentially extending arcuate section 38. As shown in FIG. 5, the nacelle 21 may comprise a single circumferentially extending arcuate section 38. In the arrangement shown in FIG. 5, the arcuate section 38 is positioned at the bottom of the nacelle 21 (i.e. it is located at the bottom of the nacelle 21 in use). Any suitable arc length for the recessed section may be chosen, for example 30°, 180°, or 270°. In the arrangement shown in FIG. 5, the circumferentially extending arcuate section 38 is "blended out". This means that the radial depth of the recessed section 24 varies in the circumferential direction, possibly non-uniformly, with the recessed section 24 being at its deepest towards, but not necessarily at, the centre, and reducing in depth towards either end.

Figure 6:
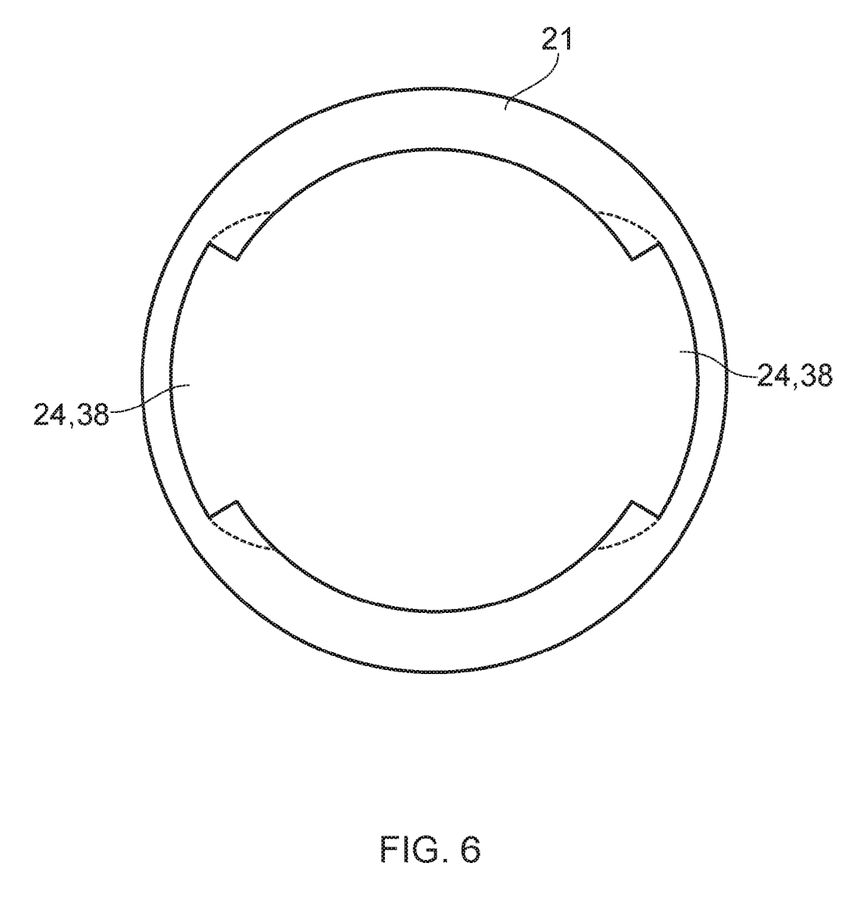
FIG. 6 schematically shows a cross-section of the nacelle of the gas turbine engine of FIG. 1 according to a fifth arrangement.

FIG. 6 shows another arrangement in which there are a pair of recessed sections 24, each in the form of a circumferentially extending arcuate sections 38. In this arrangement the arc length of the sections 38 is approximately 30°, but it should be appreciated that any suitable arc length could be used. The pair of arcuate sections 38 are located diametrically opposite on the inner sides of the nacelle 21. As in the arrangement of FIG. 5, the edges of the arcuate sections 38 may be "blended out".

Figure 7:
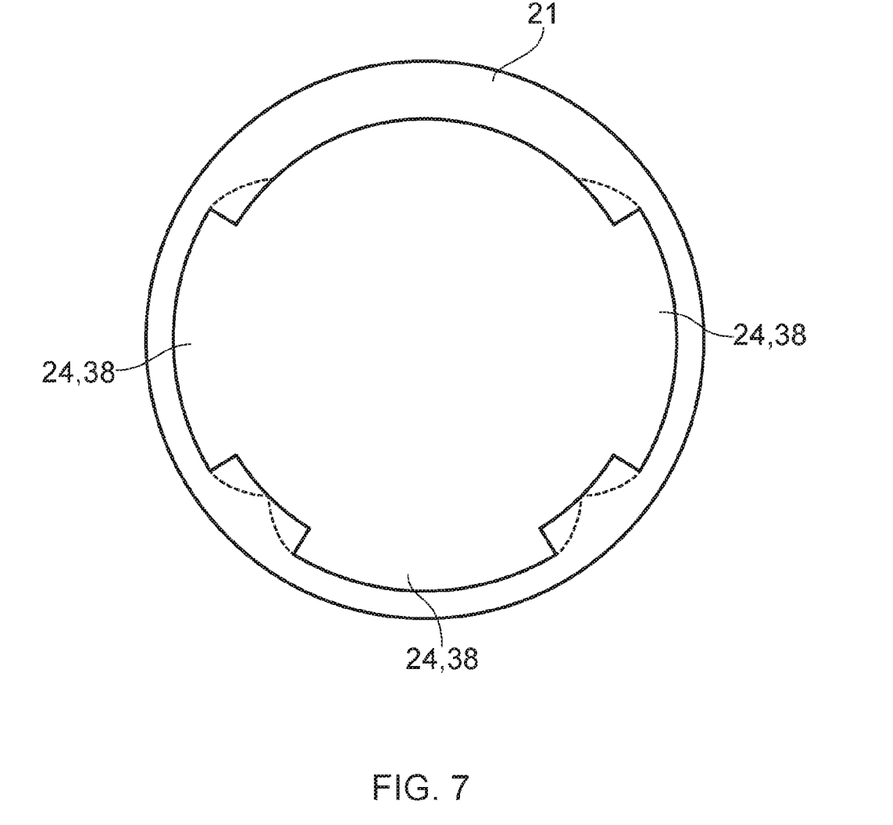
FIG. 7 schematically shows a cross-section of the nacelle of the gas turbine engine of FIG. 1 according to a sixth arrangement.

FIG. 7 shows a further arrangement in which there are three recessed sections 24, each comprising a circumferentially extending arcuate section 38 positioned in various locations around the inner circumference of the nacelle 21. In this arrangement there is a first arcuate section 38 located at the bottom of the nacelle and a pair of diametrically opposite arcuate sections 38 located at the sides of the nacelle 21. As for the arrangements of FIGS. 5 and 6, the edges of the arcuate sections 38 may be "blended out".

The use of one or more recessed sections 24 in the form of arcuate sections 38 may allow the geometry of the nacelle to be designed to improve the performance of the gas turbine engine under certain conditions. For example, to reduce the effects of crosswind on engine performance, the intake lip 26 may be made thicker towards the sides of the nacelle (i.e. only at the sides and not at the top and bottom). In order to avoid the diffuser having to have an abnormally steep gradient, a pair of opposing recessed sections 24 in the form of arcuate sections 38 located at the sides could be used in order to accommodate the fan 12 without having to increase the outer diameter of the nacelle 21.

The nacelle 21 described in relation to FIG. 5, 6 or 7 can be additionally provided with one or more arrangements to supply pressure.

The or each arrangement can be configured to supply pressure in a region of one or more of the transition regions 30. Additionally or alternatively, the arrangement can be configured to supply pressure in a region of one or more of the recessed sections 24. The pressure supplied to either or both of the one or more transition regions 30 and the one or more recessed section 24 can be positive. Additionally or alternatively, the pressure supplied to either or both of the one or more transition regions 30 and the one or more recessed sections 24 can be negative. In particular, one or more walls of the transition regions 30 could be provided with a plurality of openings. Additionally or alternatively, one or more walls of the recessed sections 24 could be provided with a plurality of openings. In this way, one or more such openings may be provided in the region of either or both of the one or more transition regions 30 and the one or more recessed sections 24. Such openings can allow air to be injected into or sucked away from either or both of the one or more of recessed sections 24 and the one or more transition regions 30.

Figure 8:
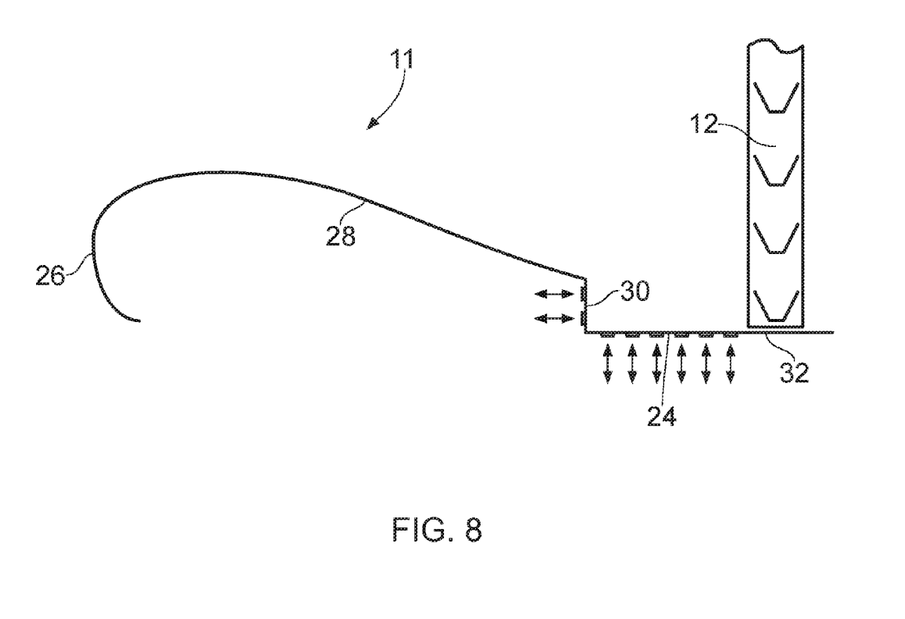
FIG. 8 schematically shows an enlarged view of the intake of the gas turbine engine of FIG. 1 according to a seventh arrangement.

As shown in FIG. 8, the nacelle 21 may be provided with an arrangement for supplying pressure. Such pressure may be provided in the region of either or both of the transition region 30 and the recessed section 24. The pressure supplied in the region of either or both of the transition region 30 and recessed section 24 can be either or both of a positive and a negative pressure. In particular, the wall of either or both of the recessed section 24 and transition region 30 could be provided with a plurality of openings through which air could be sucked or injected. This may have the effect of stabilising the separation bubble 36 or controlling its size, or both. This may be desirable in order to improve engine performance.

The arrangement can also include a controller. The controller can be configured to control the supply of pressure. Such pressure may be provided in the region of either or both of the transition region 30 and the recessed section 24. In particular, the controller can be configured to control the amount of either or both of the positive or the negative pressure supplied to the transition region 30 or the recessed section 24. Advantageously, the pressure applied can aid in one or more of the formation, stabilisation, aerodynamic re-energisation, elimination or control of the size of the separation bubble.

The arrangement can also include a feedback device. The feedback device can be configured to monitor the supply of pressure. In particular, the feedback device can be configured to monitor and inform the controller of for example, environmental or engine conditions, or further parameters which can vary during use. In this way, the controller can be configured to vary either or both of the pressure supplied to the transition region 30 or the recessed section 24 in response to a feedback signal from the feedback device. Advantageously, the addition of a feedback device to the arrangement can aid in one or more of the formation, stabilisation, aerodynamic re-energisation, elimination or control of the size of the separation bubble during changeable operational, environmental or engine conditions.

It should be noted that, while the above description has described advantages in the form of increased fan diameter, the advantages may also include a smaller nacelle external diameter or shorter intake for the same diameter fan, thereby reducing weight and drag and increasing overall efficiency.

The invention claimed is:

1. A nacelle for a turbofan gas turbine engine comprising in flow series an intake lip, a diffuser and a fan casing, the diffuser having, in flow series, a main section and a recessed section adjacent to the fan casing, wherein a transition region is provided between the main section and the recessed section, wherein the nacelle is provided with an arrangement to supply pressure in a region of either or both of the transition region and the recessed section, a surface of the transition region comprising either or both of a gradient and a profile, and an axial length of the transition region being less than a radial depth of the recessed section, and wherein a wall of the transition region includes one or more first openings, and wherein a wall of the recessed region includes one or more second openings.

2. A nacelle according to claim 1, wherein the pressure supplied in the region of either or both of the transition region and recessed section is positive.

3. A nacelle according to claim 1, wherein the pressure supplied in the region of either or both of the transition region and recessed section is negative.

4. A nacelle according to claim 1, wherein the transition region comprises a step, a slope or a curve.

5. A nacelle according to claim 1, wherein the surface of the recessed section is offset radially outward with respect to the surface of the main section.

6. A nacelle according to claim 1, wherein the radial depth of the recessed section is between 0.1%-5% of the inner diameter of the fan casing.

7. A nacelle according to claim 1, wherein the recessed section is annular or comprises a circumferentially extending arcuate section.

8. A nacelle according to claim 7, wherein the circumferentially extending arcuate section is located at the bottom of the nacelle.

9. A nacelle according to claim 7, wherein there are a plurality of recessed sections each comprising a circumferentially extending arcuate section.

10. A nacelle according to claim 9, wherein a pair of circumferentially extending arcuate sections are located on diametrically opposite sides of the nacelle.

11. A nacelle according to claim 1, further comprising an acoustic liner provided on the surface of the transition region.

12. A nacelle according to claim 1, further comprising an acoustic liner provided on the surface of the recessed section.

13. A nacelle according to claim 1, further comprising one or more acoustic liner sections which project from the surface of the transition region.

14. A nacelle according to claim 13, wherein there are a plurality of acoustic liner sections of differing lengths.

15. A turbofan gas turbine engine comprising a nacelle in accordance with claim 1.

16. A nacelle for a turbofan gas turbine engine comprising in flow series an intake lip, a diffuser and a fan casing, the diffuser having, in flow series, a main section and a recessed section adjacent to the fan casing, wherein a transition region is provided between the main section and the recessed section, wherein the nacelle is provided with an arrangement to supply pressure in a region of either or both of the transition region and the recessed section, and wherein the transition region comprises a step, the axial length of the step of the transition region being less than a radial depth of the recessed section.

* * * * *